(12) United States Patent
Hwang et al.

(10) Patent No.: US 11,767,887 B2
(45) Date of Patent: Sep. 26, 2023

(54) ANTI-REVERSE CLUTCH

(71) Applicants: Hyundai Motor Company, Seoul (KR); Kia Corporation, Seoul (KR)

(72) Inventors: Sang Woo Hwang, Seoul (KR); Jai Hak Kim, Gunpo-si (KR); Hyeong Seop Park, Hwaseong-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 0 days.

(21) Appl. No.: 17/693,030

(22) Filed: Mar. 11, 2022

(65) Prior Publication Data

US 2022/0389972 A1    Dec. 8, 2022

(30) Foreign Application Priority Data

Jun. 4, 2021  (KR) .................. 10-2021-0072992

(51) Int. Cl.
*F16D 43/202*   (2006.01)
*F16D 11/16*    (2006.01)

(52) U.S. Cl.
CPC .......... *F16D 11/16* (2013.01); *F16D 43/2028* (2013.01)

(58) Field of Classification Search
CPC ........ F16D 43/02; F16D 43/16; F16D 43/211; F16D 43/2028; F16D 11/16;
(Continued)

(56) References Cited

U.S. PATENT DOCUMENTS

| | | | |
|---|---|---|---|
| 6,389,917 B1 * | 5/2002 | Oberle | B60N 2/0224 |
| | | | 192/223.1 |
| 2009/0260466 A1 * | 10/2009 | Nakamura | B25B 21/00 |
| | | | 173/217 |

(Continued)

FOREIGN PATENT DOCUMENTS

| | | | | |
|---|---|---|---|---|
| CN | 109591881 A | * | 4/2019 | .............. B62D 3/06 |
| JP | 2013-169801 | | 9/2013 | |
| JP | 5796735 | | 8/2015 | |

OTHER PUBLICATIONS

Screw Backdriving Efficiency [Website]. Retrieved from http://www.roton.com/screw-university/screw-actions/screw-backdriving-efficiency.
(Continued)

*Primary Examiner* — David R Morris
(74) *Attorney, Agent, or Firm* — MORGAN, LEWIS & BOCKIUS LLP (57) ABSTRACT

An anti-reverse clutch apparatus includes an input shaft provided with a push handle, an output shaft mounted coaxially with the input shaft and rotatable relative to the input shaft, a clutch housing including an internal gear formed along an internal circumferential surface of the clutch housing, and a locking block, which is mounted between the output shaft and the internal circumferential surface of the clutch housing, and rotatable together with the output shaft and which includes an external gear, which is formed along an external circumferential surface of the locking block to be engaged with the internal gear, the locking block being linearly moved in a radial direction of the output shaft by a sloped surface structure formed between the push handle and the locking block so that the external gear is engaged with or disengaged from the internal gear when the push handle is rotated.

10 Claims, 9 Drawing Sheets

(58) Field of Classification Search
CPC ...... F16D 41/082; F16D 41/084; F16D 41/10; B60N 2/2356; B60N 2/236
See application file for complete search history.

(56) References Cited

U.S. PATENT DOCUMENTS

2014/0239691 A1* 8/2014 Hellrung ............. B60N 2/236
                                             297/354.1
2022/0388568 A1* 12/2022 Hwang ............. B62D 7/159

OTHER PUBLICATIONS

Mathijssen, Glenn, et al. Novel lockable and stackable compliant actuation unit for modular+ SPEA actuators. *IEEE Robotics and Automation Letters,* 2019, 4.4: 4445-4451.

* cited by examiner

ANTI-REVERSE CLUTCH

CROSS-REFERENCE TO RELATED APPLICATION

The present application claims priority to Korean Patent Application No. 10-2021-0072992, filed on Jun. 4, 2021, the entire contents of which is incorporated herein for all purposes by this reference.

BACKGROUND OF THE INVENTION

Field of the Invention

The present invention relates to an anti-reverse clutch configured to maintain high efficiency when power is input normally to an input shaft and to perform stable self-locking when power is not input to the input shaft or power is reversely input to an output shaft.

Description of Related Art

In a rear-wheel steering system (RWS) capable of steering rear wheels as well as front wheels, the radius of rotation is reduced by controlling a rear-wheel steering angle according to an antiphase, which is opposite a front-wheel steering angle, in the case of a low speed, and traveling stability is improved by controlling the rear-wheel steering angle in the same phase as that of the front-wheel steering angle in the case of a high speed.

In the rear-wheel steering system, because it is difficult to travel straight due to destabilization of a rear wheel when power is reversely input to the rear wheel, reverse operation must be prevented, not only to ensure driving stability of the rear wheel but also as a fail-safe against malfunctioning of the rear-wheel steering system.

To the present end, a conventional rear-wheel steering system employs a lead-screw-type gear mechanism capable of performing self-locking.

A lead screw has a self-locking characteristic in which backward efficiency is lowered to zero or lower under certain conditions (related to a friction characteristic or lead angle), and also has disadvantage in that forward efficiency is drastically reduced under such conditions.

Accordingly, when the forward efficiency of a gear mechanism is reduced, the output of a motor must be increased to compensate for the reduced efficiency, thereby increasing the size of the motor, manufacturing costs, energy consumption, and the like.

Because a rear-wheel steering system (RWS) that has almost the same steering angle as that of front wheels, unlike about ±3°, which is typical current rear-wheel steering angle, or a system having a wide steering angle range, which is capable of performing holonomic movement, requires a higher output, forward efficiency must necessarily be improved.

The information disclosed in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing an anti-reverse clutch apparatus configured to maintain high efficiency when power is input normally to an input shaft and to perform stable self-locking when power is not input to the input shaft or power is reversely input to an output shaft.

In accordance with various aspects of the present invention, the above and other objects may be accomplished by the provision of an anti-reverse clutch apparatus including an input shaft, which is rotated by rotation force supplied to the input shaft and which is provided with a push handle, which projects radially therefrom, an output shaft, which is mounted coaxially with the input shaft and is rotatable relative to the input shaft, a clutch housing including an internal gear formed along an internal circumferential surface of the clutch housing, and a locking block, which is mounted between the output shaft and the internal circumferential surface of the clutch housing, and rotatable together with the output shaft and which includes an external gear, which is formed along the external circumferential surface thereof to be engaged with the internal gear, the locking block being linearly moved in the radial direction of the output shaft by a sloped surface structure formed between the push handle and the locking block so that the external gear is engaged with or disengaged from the internal gear when the push handle is rotated.

Two lateral sides of an end portion of the push handle may be provided with respective push portions, each of which is in a shape of a wedge having a sloped push surface on an external surface thereof, and two lateral sides of an end portion of the locking block adjacent to the push handle may be provided with respective slide portions, each of which is in a shape of a wedge having a sloped slide surface corresponding to a corresponding one of the sloped push surfaces.

Each of the two sloped push surfaces and the two sloped slide surfaces may be configured to be inclined laterally in moving radially outwards.

The anti-reverse clutch apparatus may further include a guide unit, which connects the output shaft to the locking block via engagement between a guide hole and a guide protrusion to guide radial linear movement of the locking block while restricting rotation of the locking block relative to the output shaft.

The guide unit may include a guide protrusion, which is formed on one of facing surfaces of the output shaft and the locking block, and a guide hole, which is formed in a remaining one of the facing surfaces of the output shaft and the locking block to have a shape corresponding to the guide protrusion to thus receive therein the guide protrusion.

The anti-reverse clutch apparatus may further include a restoring unit, configured to provide the locking block with restoring force for restoring the locking block, which has been radially moved by the push handle, to an original rest position of the locking block.

The restoring unit may be a restoring spring, which is fitted over the guide protrusion and which is supported at one end portion thereof by the output shaft and at a remaining end portion thereof by the locking block.

The anti-reverse clutch apparatus may further include a rear-wheel steering motor, configured to supply rotation force to the input shaft, and a movement-converting unit configured to convert the rotative force, transmitted to the output shaft into linear movement of a screw bar connected to a rear wheel to thus steer the rear wheel.

The anti-reverse clutch apparatus may further include a controller configured to determine a position of the screw bar based on a rotational angle of the rear-wheel steering motor, a rotational angle of the push handle, and a gear ratio of the movement-converting unit.

The methods and apparatuses of the present invention have other features and advantages which will be apparent from or are set forth in more detail in the accompanying drawings, which are incorporated herein, and the following Detailed Description, which together serve to explain certain principles of the present invention.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Reference will now be made in detail to the exemplary embodiments of the present invention, examples of which are illustrated in the accompanying drawings. Wherever possible, the same reference numbers will be used throughout the drawings to refer to the same or like portions.

Hereinafter, of the present invention an exemplary embodiment of the present invention will be described in detail with reference to the accompanying drawings.

Figure 1:
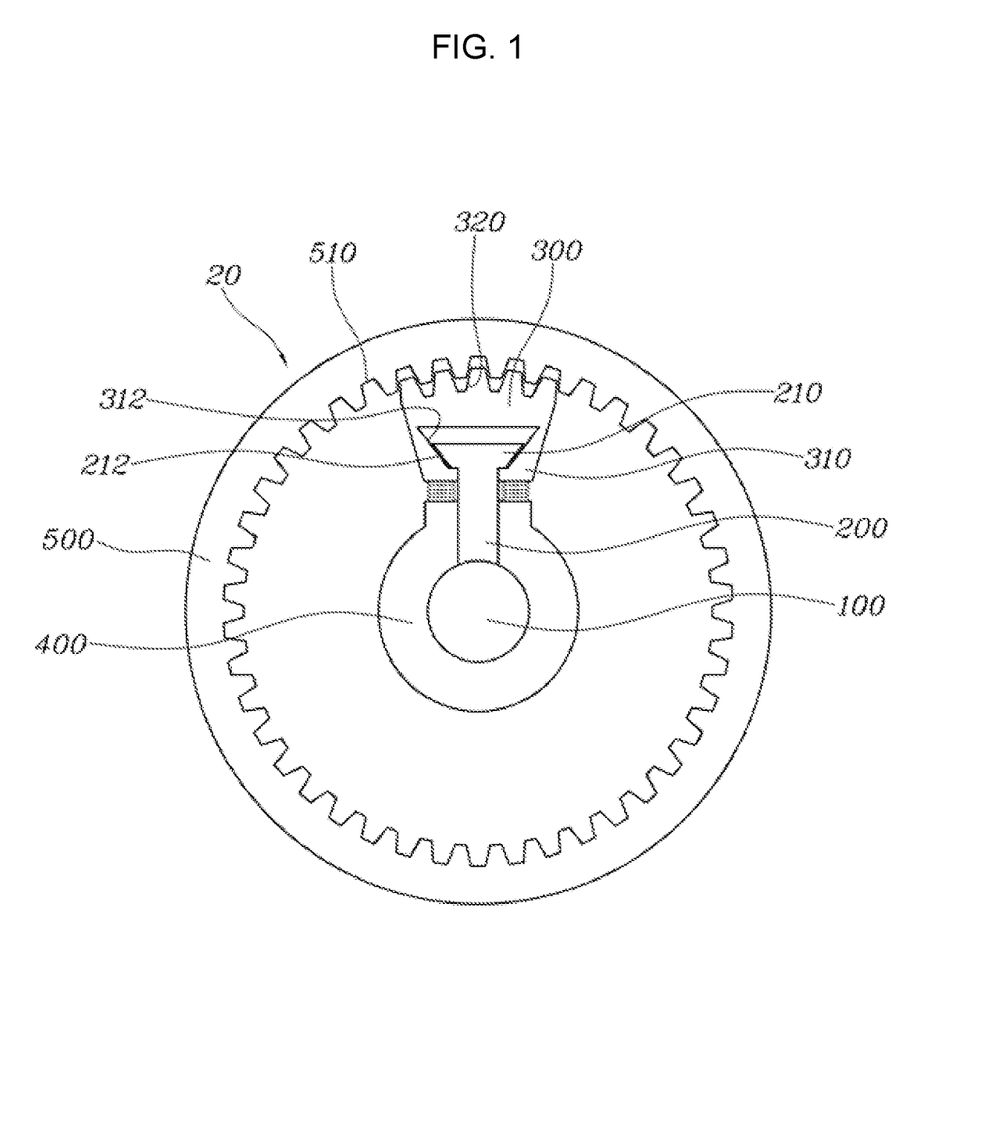
FIG. 1 is a view exemplarily illustrating the structure of an anti-reverse clutch apparatus according to various exemplary embodiments of the present invention.

FIG. 1 is a view exemplarily illustrating the structure of an anti-reverse clutch 20 according to various exemplary embodiments of the present invention.

Referring to the drawing, the anti-reverse clutch 20 according to the exemplary embodiment of the present invention includes an input shaft 100, which receives rotation force and is rotated about the central axis and which is provided with a push handle 200, which extends radially therefrom, an output shaft 400, which is disposed coaxially with the input shaft 100 and is rotatable relative to the input shaft 100, a clutch housing 500 including an internal gear 510 formed along the internal circumferential surface thereof, and a locking block 300, which is rotated with the output shaft 400 and includes an external gear 320 engaged with the internal gear 510 and which is linearly moved in a radial direction of the output shaft 400 by a rotation of the push handle 200 by a sloped surface thereof, which is in contact with the push handle 200, to cause the external gear 320 to be engaged with or disengaged from the internal gear 510.

A rotational driving source, such as an electric motor, is connected to the input shaft 100 such that the input shaft 100 is rotated by the driving force from the rotational driving source. The push handle 200 is integrally formed with the external surface of the input shaft 100 to extend radially from the rotation axis of the input shaft 100 and to rotate together with the input shaft 100.

The output shaft 400 is disposed coaxially with the input shaft 100 to be rotatable relative to the input shaft 100. The locking block 300, which has the form of a sector, is positioned at a predetermined radial distance from the rotation axis of the output shaft 400.

The lateral side surfaces of the push handle 200 and the lateral side surfaces of the locking block 300 have sloped surfaces that are in surface-contact with each other.

Accordingly, when the push handle 200 is rotated, the locking block 300 is moved radially outwards and inwards with respect to the rotation axis of the output shaft 400 by the sloped surface structure.

Furthermore, the radial outward end portion of the locking block 300 is provided with an arched external gear 320 such that the locking block 300 has the form of a sector gear.

The clutch housing 500 is immovably configured to have a cylindrical form such that the rotation axis of the clutch housing 500 is coaxial with the rotational axes of the input shaft 100 and the output shaft 400. The internal circumferential surface of the clutch housing 500 is provided with an internal gear 510.

Consequently, because the external gear 320 of the locking block 300 is engaged with or disengaged from the internal gear 510 of the clutch housing 500 by radial movement of the locking block 300, the output shaft 400 is rotated by rotation force input to the input shaft 100, whereas the input shaft 100 is not rotated by rotation force inversely input to the output shaft 400.

When the driving force from the motor is supplied to the input shaft 100, the external gear 320 is disengaged from the internal gear 510, and thus the driving force is transmitted to the output shaft 400. Meanwhile, when the driving force from the motor is not input to the input shaft 100 or rotation force is reversely input to the output shaft 400, the external gear 320 is engaged with the internal gear 510, and thus not only the rotation of the output shaft 400 but also the rotation of the input shaft 100 are locked.

As a result, since the efficiency of a gear box is improved compared to a conventional lead-screw-type anti-reverse mechanism for self-locking, it is possible to reduce motor capacity and thus to reduce weight and manufacturing costs.

Furthermore, because the locking structure is realized by engagement between teeth, it is possible to reliably perform a locking function preventing reverse input of great rotative force. Furthermore, because a locking function is automatically performed when the power supplied to the motor connected to the input shaft 100 is turned off, it is also possible to provide a fail-safe by the anti-reverse clutch 20.

FIG. 2A, FIG. 2B, FIG. 2C, and FIG. 2D are views exemplarily illustrating the operation of the anti-reverse clutch according to the exemplary embodiment of the present invention.

The coupling relationships between the push handle 200 and the locking block 300 will be described with reference to the drawings. A wedge-shaped push portion 210 having a sloped push surface 212 on the external surface thereof is formed at each of two lateral sides of the end portion of the push handle 200, and a wedge-shaped slide portion 310 is formed in each of two lateral sides of the end portion of the locking block 300 adjacent to the push handle 200 such that sloped slide surfaces 312 corresponding to the sloped push surfaces 212 are formed in the internal surface of the slide portion 310.

Each of the pair of sloped push surfaces 212 and the pair of sloped slide surfaces 312 may be configured to be inclined laterally in moving radially outwards.

For example, a groove-shaped action space is formed in the central region of the locking block 300, and the sloped slide surfaces 312 are respectively formed on the two lateral sides of the action space.

The pair of push slope portions 210 is provided in the action space, and the sloped push surfaces 212 corresponding to the sloped slide surfaces 312 are formed on respective external surfaces of the push slope portion. Consequently, the sloped push surfaces 212 are in surface-contact with the sloped slide surfaces 312.

Accordingly, when the push handle 200 is rotated by a rotation of the input shaft 100 in the state in which the external gear 320 of the locking block 300 is engaged with the internal gear 510 of the clutch housing 500, one of the pair of sloped push surfaces 212 which is positioned at the forward end portion in the rotation direction is brought into contact with the sloped slide surface 312 and pushes the sloped slide surface 312 in the rotation direction, moving the locking block 300 toward the rotational center by the sloped surface. Here, the sloped slide surface 312 may be configured to be longer than the sloped push surface 212 such that the sloped push surface 212 is stably slid along the sloped slide surface.

Consequently, because the external gear 320 is disengaged from the internal gear 510, releasing the engagement therebetween, the locking block 300 is rotated with the push handle 200, and the output shaft 400 is also rotated together therewith.

The anti-reverse clutch according to the exemplary embodiment of the present invention further includes a guide unit, which connects the output shaft 400 to the locking block 300 via engagement between a guide hole and a guide protrusion to guide the radial linear movement of the locking block 300 while restricting the rotation of the locking block 300 relative to the output shaft 400.

Figure 3A:
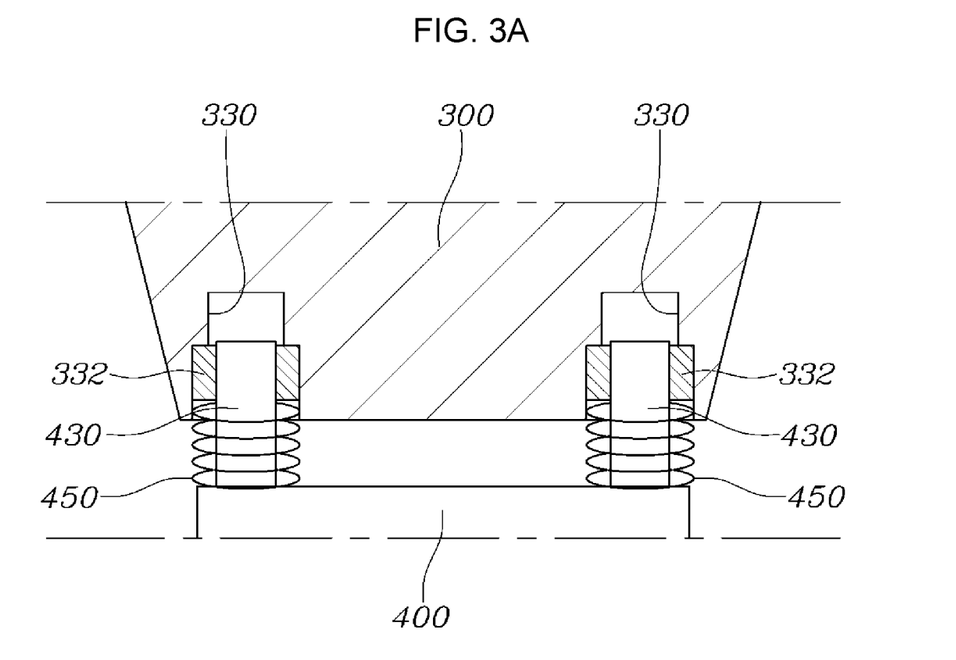
FIG. 3A and FIG. 3B are views exemplarily illustrating construction and operation of a guide unit and a restoring unit according to the exemplary embodiment of the present invention.
Figure 3B:
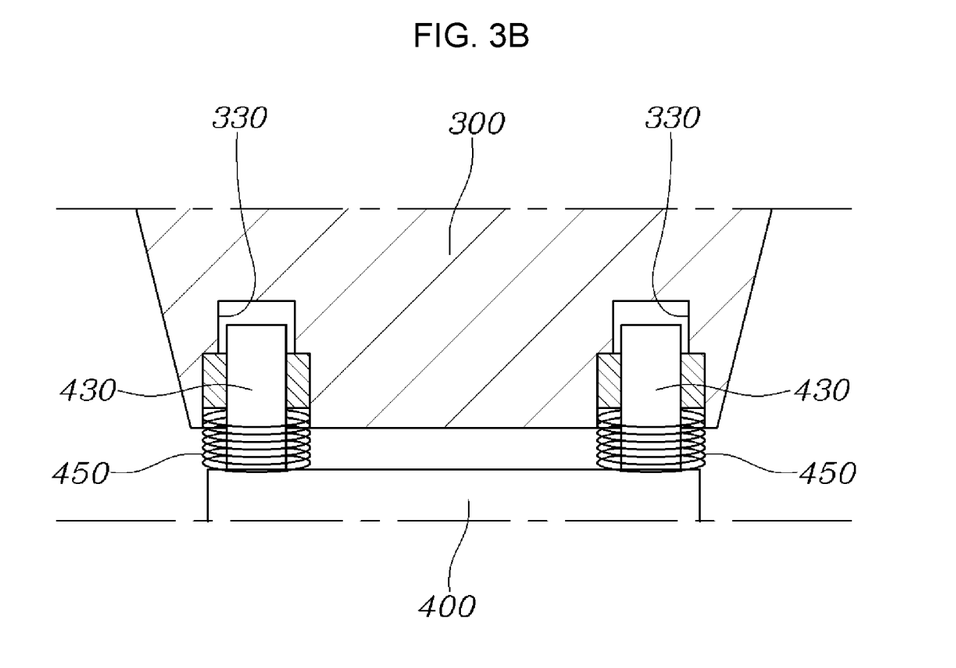

FIG. 3A and FIG. 3B are views exemplarily illustrating the construction and operation of the guide unit and a restoring unit according to the exemplary embodiment of the present invention.

The guide unit will now be described with reference to the drawings. The guide unit includes a guide protrusion, which is formed on one of the facing surfaces of the output shaft 400 and the locking block 300, and a guide hole, which is formed in the other of the facing surfaces of the output shaft 400 and the locking block 300 to have a shape corresponding to the guide protrusion to thus receive therein the guide protrusion.

For example, a pair of first guide protrusions 430, each of which has the form of a cylindrical column or a polygonal column, are formed at two locations on the surface of the output shaft 400 that faces the locking block 300 in a radial direction, and a pair of first guide holes 330, each of which has a form corresponding to a corresponding one of the first guide protrusions 430, are formed in two locations on the surface of the locking block 300 that faces the output shaft 400 in a radial direction thereof.

Because each of the first guide protrusions 430 and the first guide holes 330 extends to have a predetermined length, and the first guide protrusions 430 are fitted into the first guide holes 330 and are linearly moved therein, the locking block 300 is guided to be linearly moved only in a radial direction thereof.

Here, a bushing 332 may be fitted into each of the internal circumferential surfaces of the first guide holes 330 to support the linear movement of the first guide protrusion 430.

Figure 4A:
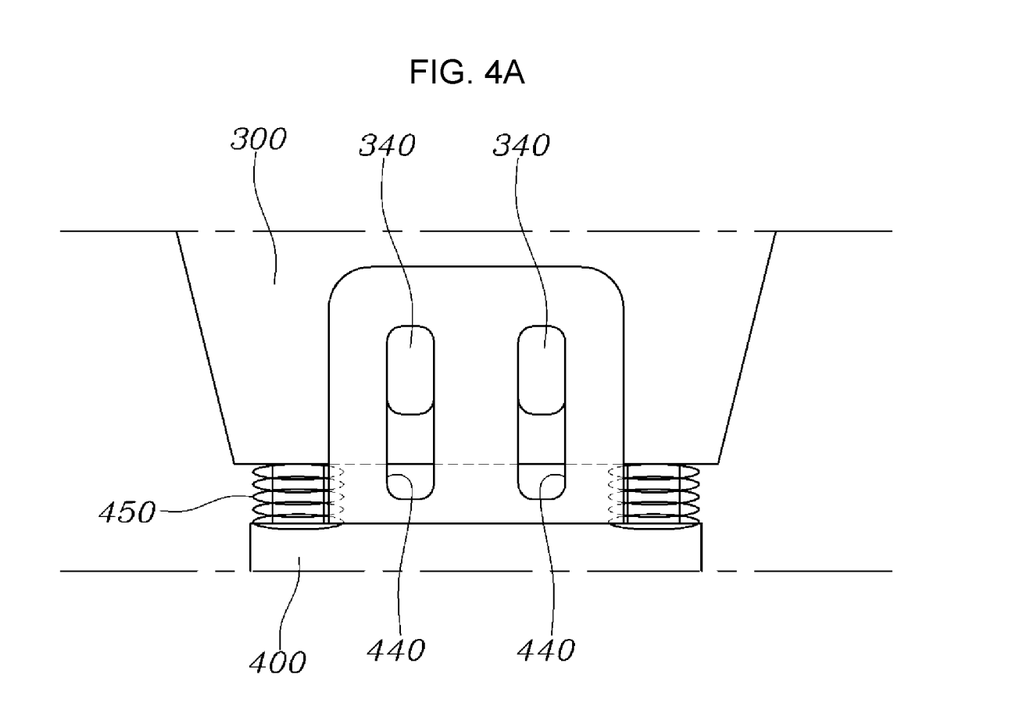
FIG. 4A and FIG. 4B are views exemplarily illustrating construction and operation of a guide unit according to various exemplary embodiments of the present invention.
Figure 4B:
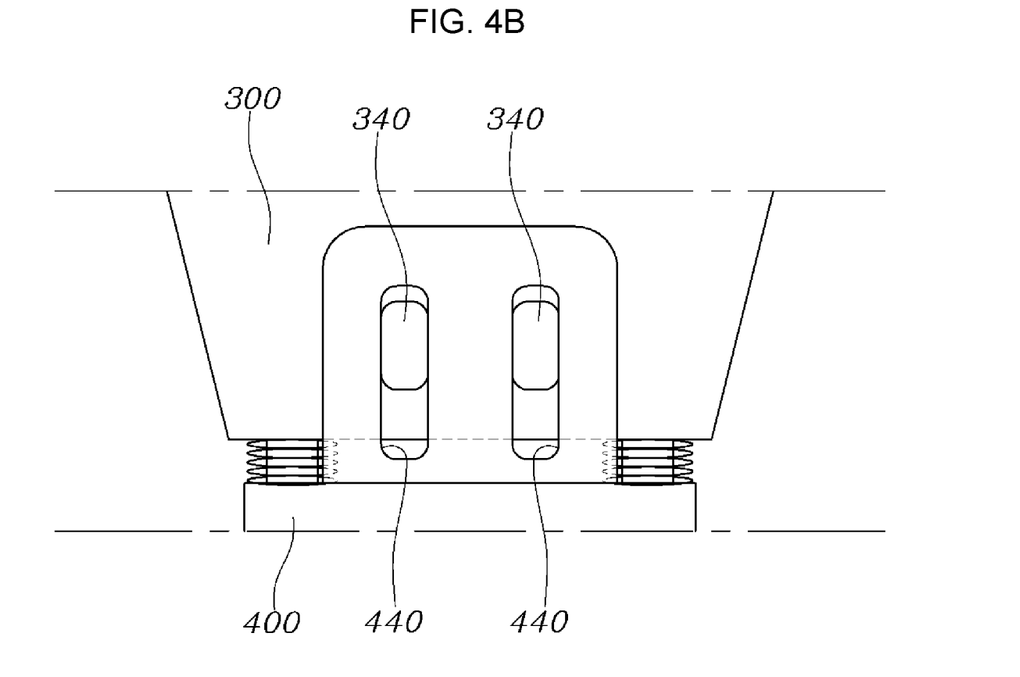
Figure 5:
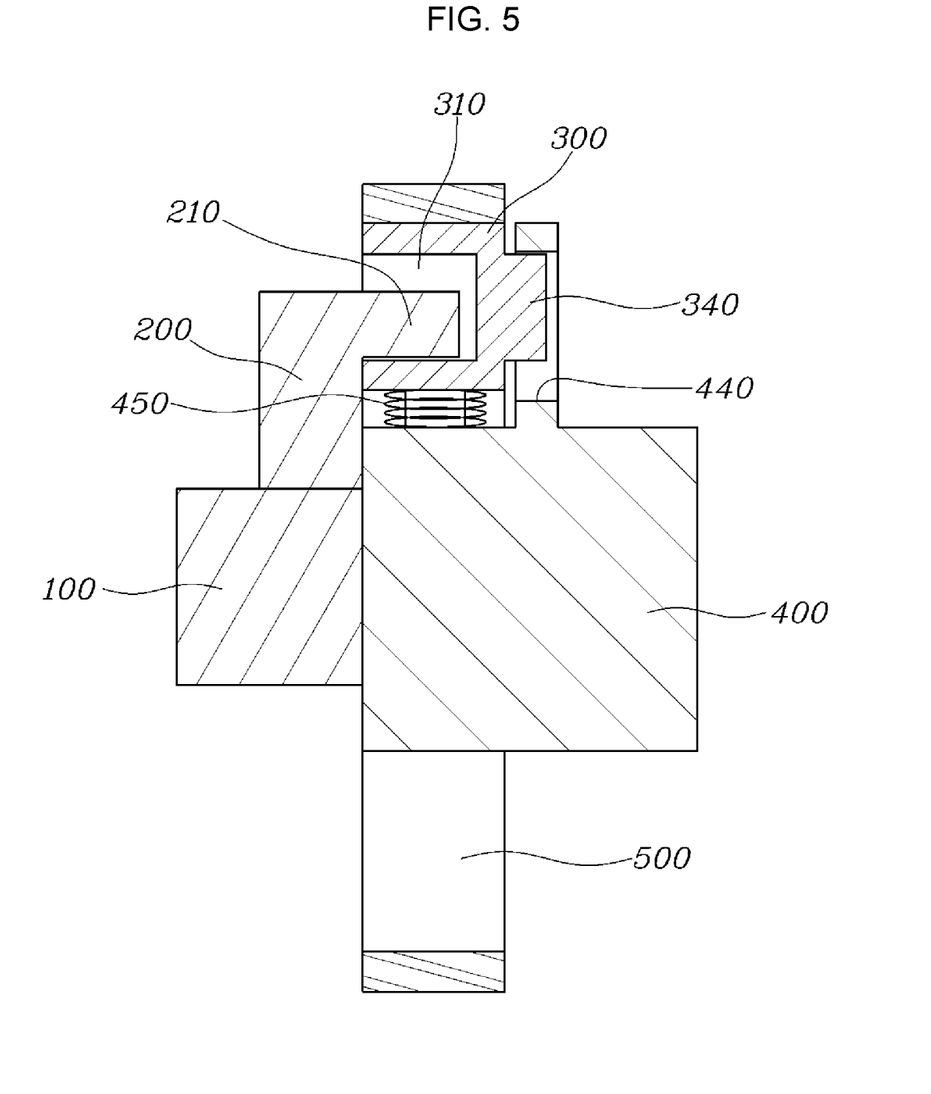
FIG. 5 is a side cross-sectional view exemplarily illustrating the anti-reverse clutch apparatus according to the exemplary embodiment of the present invention.

FIG. 4A and FIG. 4B are views exemplarily illustrating construction and operation of a guide unit according to various exemplary embodiments of the present invention. FIG. 5 is a side cross-sectional view exemplarily illustrating the anti-reverse clutch 20 according to the exemplary embodiment of the present invention.

Referring to the drawings, the anti-reverse clutch according to the exemplary embodiment of the present invention may further include an additional guide structure, in addition to the guide unit including the first guide protrusions 430 and the first guide holes 330, to improve the operational reliability of the locking block 300.

To the present end, a portion of the output shaft 400 radially extends toward the locking block 300.

A pair of second guide protrusions 340 are formed at the end portion of the locking block 300 that faces the extending portion of the output shaft 400 in the axial direction, and a pair of second guide long holes 440 are formed at the end portion of the output shaft 400 that faces the locking block 300 in the axial direction thereof.

Here, the second guide holes 440 are configured to extend in a radial direction, and the second guide protrusions 340 are movably disposed in the second guide holes 440, whereby the locking block 300 is guided to be linearly moved only in a radial direction thereof.

As illustrated in FIG. 3A and FIG. 3B, the anti-reverse clutch according to the exemplary embodiment of the present invention further includes the restoring unit, configured to provide the locking block 300 with restoring force for restoring the locking block 300, which has been radially moved by the push handle 200, to the original rest position.

The restoring unit may be a restoring spring 450 configured to have the form of a coil spring, which is fitted over the guide protrusion and which is supported at one end portion thereof by the output shaft 400 and at the other end portion thereof by the locking block 300.

Accordingly, when the rotation force transmitted to the push handle 200 is removed in the state in which the locking block 300 is moved radially inwards toward the rotational center of the output shaft 400, the elastic restoring force of the restoring spring 450 is applied to the locking block 300, moving the locking block 300 radially outwards.

Consequently, the external gear 320 of the locking block 300 is engaged with the internal gear 510 of the clutch housing 500, performing self-locking of the output shaft 400.

Figure 6:
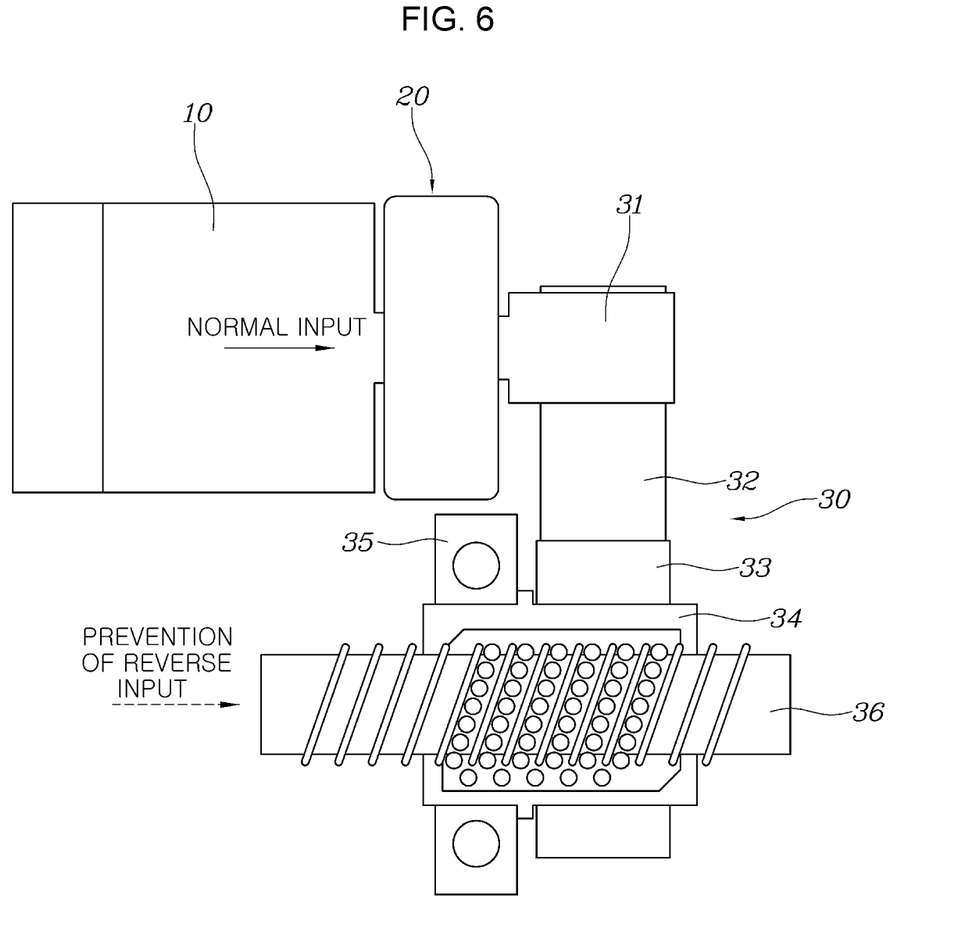
FIG. 6 is a view exemplarily illustrating the anti-reverse clutch apparatus according to the exemplary embodiment of the present invention, which is applied to a rear-wheel steering system.

FIG. 6 is a view exemplarily illustrating the anti-reverse clutch 20 according to the exemplary embodiment of the present invention, which is applied to a rear-wheel steering system.

As illustrated in the drawing, the anti-reverse clutch 20 according to the exemplary embodiment of the present invention may be applied to a rear-wheel steering system. In the instant case, the anti-reverse clutch 20 further includes a rear-wheel steering motor 10, configured to supply rotation force to the input shaft 100, and a movement-converting unit 30, configured to convert the rotative force, transmitted to the output shaft 400 into linear movement of a screw bar connected to the rear wheel to thus steer the rear wheel.

The movement-converting unit 30 is constructed such that a motor pulley 31 is coupled to the output shaft 400 and the motor pulley 31 and a ball nut pulley 33 are connected to each other via a belt 32. Furthermore, a ball nut 34 is fixed in the ball nut pulley 33, and is rotatably supported via a bearing 35. A ball screw bar 36 extends through the ball nut 34.

Consequently, when the output shaft 400 is rotated by the rear-wheel steering motor 10, the motor pulley 31 is rotated, and the ball nut pulley 33 and the ball nut 34 are rotated with the rotation force transmitted via the belt 32. When the ball nut 34 is rotated, the ball screw bar 36 is linearly moved in a lateral direction, adjusting the steering angle of the rear wheel.

Here, since the ball screw is applied as a component of the movement-converting unit 30 configured to converting the rotative movement of the rear-wheel steering motor 10 into linear movement, it is possible to provide high forward efficiency compared to a conventional lead screw.

According to the exemplary embodiment of the present invention, because the anti-reverse clutch 20 is provided between the rear-wheel steering motor 10 and the movement-converting unit 30, driving force is input to the anti-reverse clutch 20 from the rear-wheel steering motor 10. Meanwhile, when force is input to the anti-reverse clutch 20 from the movement-converting unit 30, the anti-reverse clutch 20 is maintained in the locked state, performing the self-locking function.

Consequently, since force is transmitted only when the rear-wheel steering motor 10 is operated and the self-locking function is stably realized when force is reversely input, a rear-wheel steering system (RWS) configured for operating throughout a wide steering angle range using a front-wheel SBW is realized.

Furthermore, since the self-locking is automatically realized not only when the rear-wheel steering motor 10 is not operated but also when the power is turned off, it is also possible to perform the fail-safe function.

The anti-reverse clutch 20 according to the exemplary embodiment of the present invention may further include a controller configured to determine the position of the screw bar based on the rotational angle of the rear-wheel steering motor 10, the rotational angle of the push handle 200, and the gear ratio of the movement-converting unit 30.

For reference, the controller according to various exemplary embodiments of the present invention may be embodied as nonvolatile memory, configured to store an algorithm configured to control the operation of various components of a vehicle or data relating to software instructions for executing the algorithm, and a processor configured to perform operations, which will be described below, using the data stored in the memory. Here, the memory and the processor may be embodied as separate chips. Alternatively, the memory and the processor may be embodied as a single chip in which the memory and the processor are integrated. The processor may be embodied as one or more processors.

For example, when the rear-wheel steering motor 10 is not operating, the state in which the push handle 200 and the locking block 300 are positioned at the same rotational angle is maintained.

The position of the screw bar is determined using the following equation (1). The angle of the rear-wheel steering motor 10 is determined by a motor position sensor.

$$X_{screw} = R_{gear} \times \theta_{MPS} \quad (1)$$

(herein, $X_{screw}$ is a position of the screw bar, $R_{gear}$ is a gear ratio (mm/rev) of the movement-converting unit 30, and $\theta_{MPS}$ is an angle of the rear-wheel steering motor.)

However, because the push handle 200 is rotated further clockwise than the locking block 300 when the rear-wheel steering motor 10 is rotated clockwise, there is a difference in angle between the push handle 200 and the locking block 300.

Accordingly, the position of the screw bar in the state of being operated clockwise is determined using the following equation (2).

$$X_{screw} = R_{gear} \times (\theta_{MPS} - \theta_{release}) \quad (2)$$

(herein, $X_{screw}$ is a position of the screw bar, $R_{gear}$ is gear ratio (mm/rev) of the movement-converting unit 30, $\theta_{MPS}$ is an angle of the rear-wheel heel steering motor, and $\theta_{release}$ is an angle for releasing locking of the locking block 300 (a difference in angle between the push handle 200 and the locking block 300).)

Meanwhile, because the push handle 200 is rotated further counterclockwise than the locking block 300 when the rear-wheel steering motor 10 is rotated counterclockwise, there is also a difference in angle between the push handle 200 and the locking block 300.

Accordingly, the position of the screw bar in the state of being operated counterclockwise is determined using the following equation (3).

$$X_{screw} = R_{gear} \times (\theta_{MPS} - \theta_{release}) \quad (3)$$

(herein, $X_{screw}$ is a position of the screw bar, $R_{gear}$ is a gear ratio (mm/rev) of the movement-converting unit 30, $\theta_{MPS}$ is and angle of the rear-wheel steering motor, and $\theta_{release}$ is an angle for releasing locking of the locking block 300 (a difference in angle between the push handle 200 and the locking block 300))

In the present way, the exemplary embodiment of the present invention is configured for determining backlash occurring during release of the locked state of the locking block 300 and of performing more precise position control of the rear-wheel steering system by applying the determined value to the determination of the position of the screw bar Hereinafter, the operation of the structure in which the anti-reverse clutch 20 according to the exemplary embodiment of the present invention is applied to the rear-wheel steering system will be described.

Figure 2A:
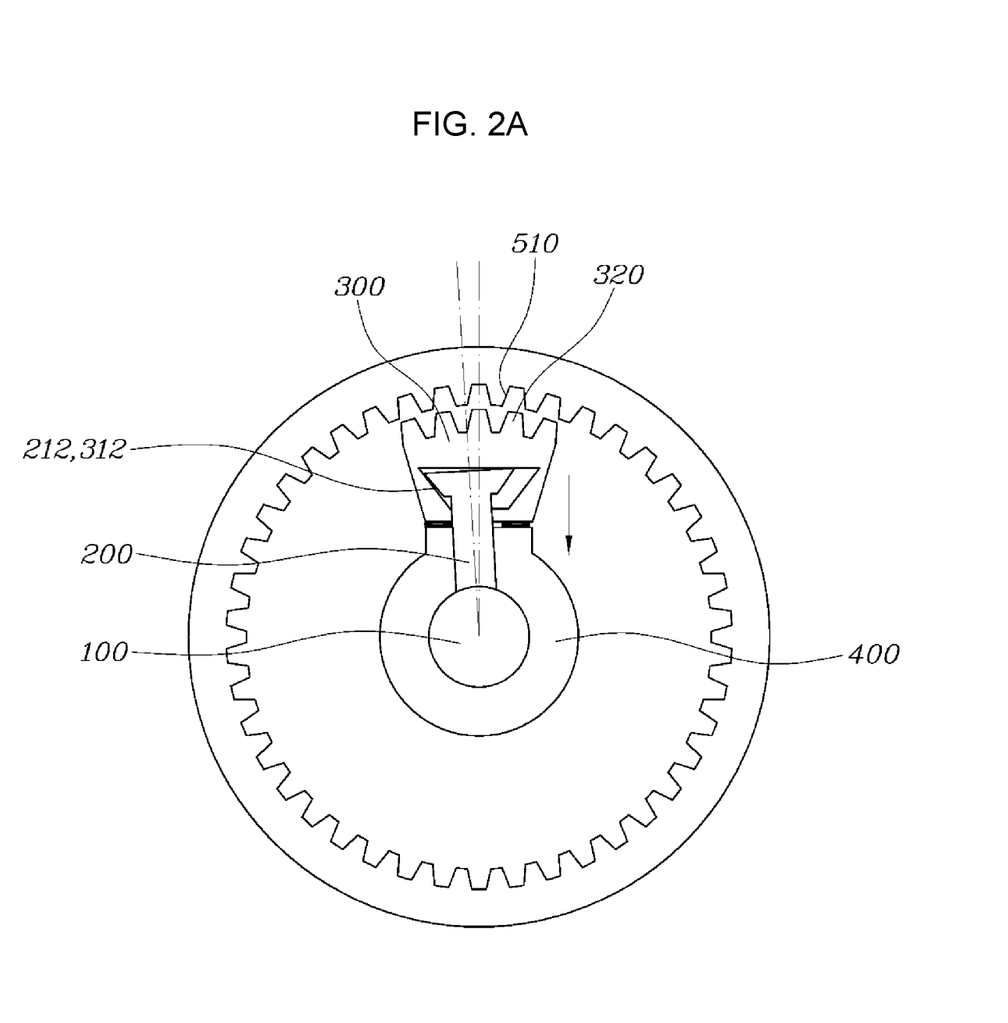
FIG. 2A, FIG. 2B, FIG. 2C, and FIG. 2D are views exemplarily illustrating the operation of the anti-reverse clutch apparatus according to the exemplary embodiment of the present invention.

When counterclockwise driving torque is applied to the input shaft 100 from the rear-wheel steering motor 10, the push handle 200 is rotated counterclockwise about the rotation axis, as illustrated in FIG. 2A.

Consequently, because the sloped push surface 212 of the push handle 200 pushes the sloped slide surface 312 of the locking block 300, which is the forward end portion of the slide portion 310, in a counterclockwise direction, the push handle 200 is configured to pull the locking block 300 toward the rotational center by the slope structure.

When the push handle 200 is rotated counterclockwise to a predetermined angle, a difference in angle is formed between the push handle 200 and the locking block 300, and the locking block 300 is linearly moved in a radially inward direction toward the rotational center.

Consequently, the external gear 320 of the locking block 300 is disengaged from the internal gear 510 of the clutch housing 500, allowing rotation of the locking block 300.

Figure 2B:
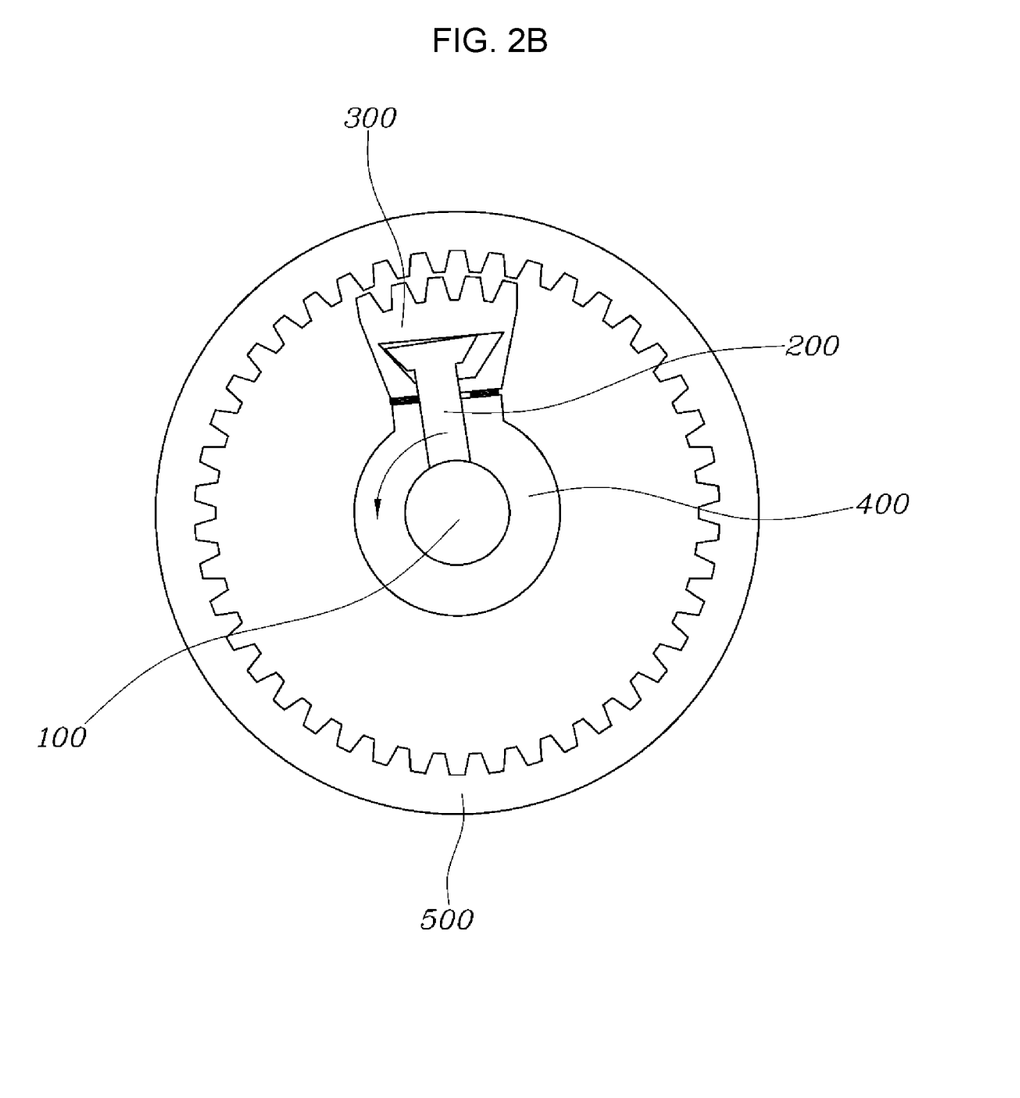

Because the push handle 200 supplies rotation force to the locking block 300 while continuously pushing the locking block 300 counterclockwise, the output shaft 400, which is connected to the locking block 300 via the guide unit, is also rotated counterclockwise, as illustrated in FIG. 2B.

Figure 2C:
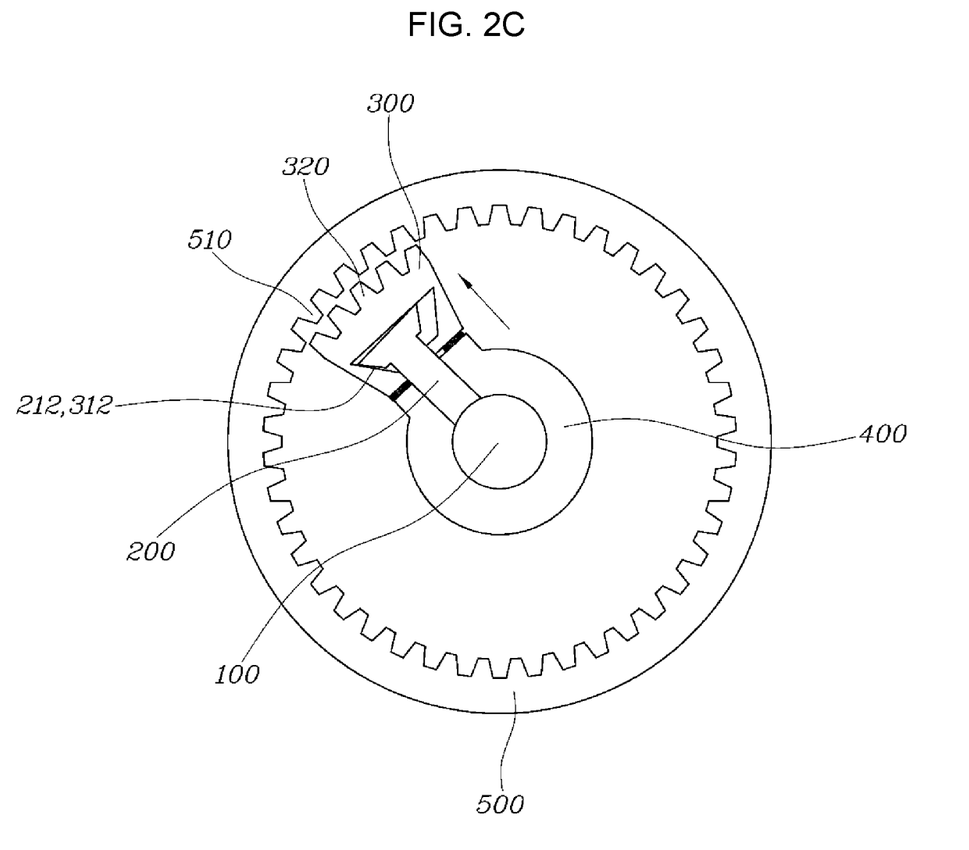

Meanwhile, when application of the driving torque to the rear-wheel steering motor 10 is halted during rotation of the output shaft 400, the locking block 300 is moved in a radially outward direction away from the rotational center.

Subsequently, the external gear 320 of the locking block 300 is engaged with the internal gear 510, restricting rotation of the locking block 300, as illustrated in FIG. 2C.

Figure 2D:
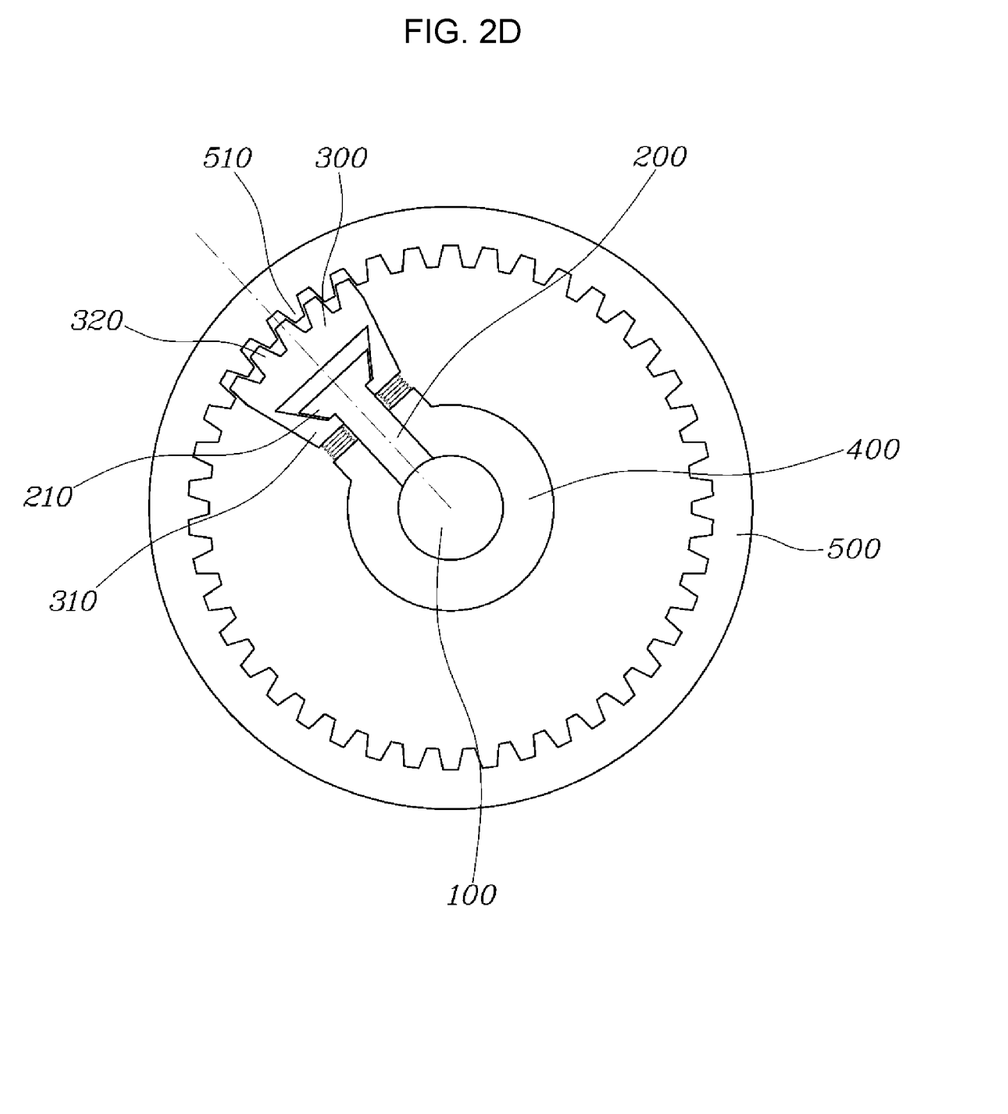

Thereafter, the push handle 200 is restored to the original position, at which the push handle 200 is not rotated, by the sliding structure between the sloped slide surface 312 and the sloped push surface 212, and the angle of the push handle 200 coincides with the angle of the locking block 300, as illustrated in FIG. 2D.

Accordingly, it is possible to maintain both the locking block 300 and the output shaft 400 in the locked state.

As described above, when the anti-reverse clutch 20 according to the exemplary embodiment of the present invention is applied to a rear-wheel steering system, the force is transmitted only when the rear-wheel steering motor 10 is operated, and stable self-locking is realized when force is reversely input, realizing a rear-wheel steering system (RWS) configured for operating throughout a wide steering angle range using a front-wheel SBW.

Furthermore, since the self-locking is automatically performed not only when the rear-wheel steering motor 10 is not operated but also when the power is turned off, it is possible to perform the fail-safe function.

Furthermore, by the locking structure through engagement between gear teeth, it is possible to stably perform a locking function even upon reverse input of great force. Furthermore, since the efficiency of a gear box is improved compared to a conventional lead-screw-type anti-reverse mechanism for self-locking, it is possible to reduce the capacity of the motor and thus to reduce manufacturing costs and weight.

As is apparent from the above description, when the anti-reverse clutch according to various exemplary embodiments of the present invention is applied to a rear-wheel steering system, there are advantages in that transmission of power is allowed only when the rear-wheel steering motor is operated and a stable self-locking function is realized when power is reversely input and in that it is possible to perform the fail-safe function because the self-locking is automatically performed not only when the rear-wheel steering motor is not operated but also when power is turned off.

Furthermore, by the locking structure, achieved through engagement between gear teeth, it is possible to stably perform a locking function even upon reverse input of great force. Furthermore, since the efficiency of a gear box is improved compared to a conventional lead-screw-type anti-reverse mechanism for self-locking, it is possible to reduce the capacity of the motor and thus to reduce manufacturing costs and weight.

In addition, the term related to a control device such as "controller", "control unit", "control device" or "control module", etc refers to a hardware device including a memory and a processor configured to execute one or more steps interpreted as an algorithm structure. The memory stores algorithm steps, and the processor executes the algorithm steps to perform one or more processes of a method in accordance with various exemplary embodiments of the present invention. The control device according to exemplary embodiments of the present invention may be implemented through a nonvolatile memory configured to store algorithms for controlling operation of various components of a vehicle or data about software commands for executing the algorithms, and a processor configured to perform operation to be described above using the data stored in the memory. The memory and the processor may be individual chips. Alternatively, the memory and the processor may be integrated in a single chip. The processor may be implemented as one or more processors. The processor may include various logic circuits and operation circuits, may process data according to a program provided from the memory, and may generate a control signal according to the processing result.

The control device may be at least one microprocessor operated by a predetermined program which may include a series of commands for carrying out the method disclosed in the aforementioned various exemplary embodiments of the present invention.

The aforementioned invention can also be embodied as computer readable codes on a computer readable recording medium. The computer readable recording medium is any data storage device that can store data which can be thereafter read by a computer system. Examples of the computer readable recording medium include hard disk drive (HDD), solid state disk (SSD), silicon disk drive (SDD), read-only memory (ROM), random-access memory (RAM), CD-ROMs, magnetic tapes, floppy discs, optical data storage devices, etc. and implementation as carrier waves (e.g., transmission over the Internet).

In an exemplary embodiment of the present invention, each operation described above may be performed by a control device, and the control device may be configured by multiple control devices, or an integrated single control device.

In an exemplary embodiment of the present invention, the control device may be implemented in a form of hardware or software, or may be implemented in a combination of hardware and software.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. An anti-reverse clutch apparatus comprising:
    an input shaft, which is rotated by rotation force supplied to the input shaft and which is provided with a push handle projecting radially from the input shaft;
    an output shaft, which is mounted coaxially with the input shaft and is rotatable relative to the input shaft;
    a clutch housing including an internal gear formed along an internal circumferential surface of the clutch housing; and
    a locking block, which is mounted between the output shaft and the internal circumferential surface of the clutch housing, and rotatable together with the output shaft,
    wherein the locking block includes an external gear, which is formed along an external circumferential surface of the locking block to be engaged with the internal gear,
    wherein the locking block is linearly movable in a radial direction of the output shaft by a sloped surface structure formed between the push handle and the locking block so that the external gear is engaged with or disengaged from the internal gear when the push handle is rotated,
    wherein two lateral sides of an end portion of the push handle are provided with respective push portions, each of which is in a shape of a wedge having a sloped push surface on an external surface thereof, and
    wherein two lateral sides of an end portion of the locking block adjacent to the push handle are provided with respective slide portions, each of which is in a shape of a wedge having a sloped slide surface corresponding to a corresponding one of the sloped push surfaces.

2. The anti-reverse clutch apparatus of claim 1, wherein each of the two sloped push surfaces and the two sloped slide surfaces is inclined laterally in moving radially outwards.

3. The anti-reverse clutch apparatus of claim 2, wherein the two sloped slide surfaces are longer than the two sloped push surfaces so that at least one of the two sloped push surfaces is slid along at least one of the two sloped slide surfaces.

4. The anti-reverse clutch apparatus of claim 1, further including:
    a guide unit, which connects the output shaft to the locking block via engagement between a guide hole and a first guide protrusion to guide radial linear movement of the locking block while restricting rotation of the locking block relative to the output shaft.

5. The anti-reverse clutch apparatus of claim 4, wherein the first guide protrusion is formed on one of facing surfaces of the output shaft and the locking block, and the guide hole is formed in a remaining one of the facing surfaces of the output shaft and the locking block to have a shape corresponding to the first guide protrusion to thus receive the first guide protrusion therein.

6. The anti-reverse clutch apparatus of claim 4, further including:
    a restoring unit, configured to provide the locking block with restoring force for restoring the locking block, which has been radially moved by the push handle, to an original rest position of the locking block.

7. The anti-reverse clutch apparatus of claim 6, wherein the restoring unit is a restoring spring, which is fitted over the first guide protrusion and which is supported at one end portion thereof by the output shaft and at a remaining end portion thereof by the locking block.

8. The anti-reverse clutch apparatus of claim 4, further including a second guide protrusion formed at an end portion of the locking block that faces an extending portion of the output shaft in an axial direction of the output shaft, and a guide slot formed at an end portion of the output shaft that faces the locking block in the axial direction, wherein the guide slot extends in the radial direction, and the second guide protrusion is movably disposed in the guide slot, and the locking block is guided in the guide slot to be linearly moved only in the radial direction.

9. The anti-reverse clutch apparatus of claim 1, further including:
    a rear-wheel steering motor configured to supply the rotation force to the input shaft; and
    a movement-converting unit configured to convert rotation force transmitted to the output shaft, into linear movement of a screw bar connected to a rear wheel to steer the rear wheel.

10. The anti-reverse clutch apparatus of claim 9, further including a controller configured to determine a position of the screw bar based on a rotational angle of the rear-wheel steering motor, a rotational angle of the push handle, and a gear ratio of the movement-converting unit.

* * * * *